Patented Sept. 25, 1951

2,568,748

UNITED STATES PATENT OFFICE 2,568,748

COMPOSITIONS AND PROCESS FOR RESOLVING EMULSIONS

Willard H. Kirkpatrick, Sugar Land, Tex., and Doyne L. Wilson, Pasadena, Calif., assignors to Visco Products Company, Houston, Tex., a corporation of Delaware No Drawing. Application November 10, 1950, Serial No. 195,136

15 Claims. (Cl. 252—344)

This invention relates to the art of resolving petroleum emulsions, more particularly petroleum emulsions of the oil-in-water type, encountered, for example, in the production, handling and refining of petroleum. These oil-in-water emulsions, or so-called reversed emulsions, occur frequently in the Flower's Bluff, Freer, and Seven Sisters pools of Southwestern Texas, and are occasionally encountered in other oil producing areas.

This application is a continuation-in-part of our copending application Serial No. 646,964 filed February 11, 1946 which in turn is a continuation-in-part of application Serial No. 521,680 filed February 9, 1944, both cases now being abandoned. The present application is also a continuation-in-part of our application Serial No. 15,278 filed March 16, 1948.

One of the objects of this invention is to provide a new and improved process for separating petroleum emulsions into their component parts, i. e., oil and water.

A further object is to provide novel, water wettable, interfacial and surface active products or compositions adapted for use as demulsifiers, or for other uses where water wettable properties or characteristics are desirable.

A still further object of the invention is to provide a process for the resolution of emulsions encountered outside oil fields, as, for example, water in the hold of a ship contaminated with oil. In such cases clarification of the water prior to disposal in a harbor or bay area may be effected by the methods herein described. Likewise, the compositions of the present invention may be employed in various other cases where separation of emulsions into their components is desired.

Further objects will appear from the following description in which the reagents and the processes for their employment relate to the treatment of petroleum emulsions.

Oil field emulsions, for the most part, are of the water-in-oil type. The oil-in-water or reversed emulsions to which the present invention is particularly directed, are frequently encountered, however, in the areas noted above. A reversed emulsion, as encountered in the oil fields, contains a small amount of oil, usually less than one per cent, as the disperse phase, and its presence is denoted by the milky tinge which it imparts to the water, usually low in salt content. In the aforementioned areas, both types of emulsions are produced together; that is, the water which is the disperse phase in the normal water-in-oil emulsion is, in itself, an oil-in-water emulsion. Ordinary demulsifiers which resolve water-in-oil emulsions, have little or no effect on oil-in-water type emulsions. These latter emulsions have heretofore proven difficult to resolve and the recovery of the oil contained therein, which often means the difference between a successful and an unsuccessful operation, has presented many problems.

We have discovered that petroleum emulsions, and particularly the reversed oil-in-water emulsions, may be readily and quickly resolved into their component parts by use of any one, or a combination, of the chemicals disclosed herein. Further, our investigations show that after treatment the water discharged from the gun barrel or settling tanks has excellent clarity, and that the recovered oil is homogeneous, e. g., free from flocculent materials obtained when inorganic electrolytes such as calcium chloride and/or zinc chloride, with or without protective colloids, are used. In some instances, it has been found to be preferable to treat a mixture containing both types of emulsions by a single fluid containing a composition of the present invention and an additional substance adapted to resolve the normal water-in-oil emulsion, where the chemicals for the different emulsions are compatible.

According to this invention, it has been found that new and improved compositions are obtained by partially dehydrating an alkylolamine, preferably triethanolamine, and then reacting the resultant intermediate dehydrated product with a detergent forming body possessing an acidic function, and containing a hydrocarbon structure of at least 8 carbon atoms. The detergent forming body may be selected from the group comprising higher fatty acids, rosin, resin acids, naphthenic acids and their esters or amides, in which there is a hydrocarbon structure having 8 or more carbon atoms. As will hereinafter be explained, these substances are utilized in the preparation of our demulsifying agents, and various combinations and orders of reacting the various chemicals are contemplated as will be seen from the following discussion.

For the purpose of this invention the condensation product prepared in the manner previously described is preferably at least partially neutralized with an acid, and the partially neutralized product is admixed with one or more hydrophilic un-ionized colloids in the presence of a suitable diluent. The resultant compositions are especially useful for resolving reversed emulsions of the oil-in-water type.

The quantity of the hydrophilic un-ionized colloid should correspond to from 5% to 25% by weight of the sub-resinous emulsion breaking chemical in order to obtain the desired results. Good results have been obtained with about 10% by weight of the hydrophilic un-ionized colloid. Compositions containing about 20% by weight of the hydrophilic un-ionized colloid have proven even more effective.

A further feature of the invention is the provision of compositions of improved stability and effectiveness containing a gel liquefying agent or gel inhibiting agent, preferably urea. The latter ingredient apparently has no effect on reversed emulsions, but it permits a higher concentration of the active ingredients before the composition tends to gel when subjected to low temperatures. The higher concentration of the active ingredients also has a very pronounced effect on the results obtained in breaking petroleum emulsions. Instead of urea other water soluble homologues or analogues thereof may be employed, e. g., methyl urea. Urea derivatives, including salts, and related compounds, such as dicyandiamide, as well as other compounds having a gel liquefying action on the hydrophilic un-ionized colloid may also be used to partly or wholly replace the urea, it being understood, however, that urea is the preferred gel liquefying agent for the purpose of the invention.

The substance which is reacted with the detergent forming body has been described as a partially dehydrated alkylolamine because it is made by heating an alkylolamine, or mixture of alkylolamines, with the elimination of a major proportion of the chemically available water present. It is only partially dehydrated in the sense that it is still capable of further reaction with a detergent forming body of the type described, with a further elimination of chemically available water to produce a sub-resinous water wettable colloid which is then at least partially neutralized and then admixed with the hydrophilic un-ionized colloid. The expression "chemically available water" is employed to describe water formed from elements present in the molecule as distinguished, for example, from the preparation of anhydrous alkylolamines by removing any free or contaminating water which may be present. The removal of chemically available water may also be described as molecular dehydration. The amount of water which we remove is very important for our purpose and in order for us to secure optimum efficiency as a reversed emulsion breaker the alkylolamine must be substantially dehydrated. If a lesser portion of chemically available water is removed in the process, the efficiency of the product suffers to a corresponding degree. However, it should be understood that there is some chemically available water remaining in our preferred intermediate which could be further dehydrated if the material was subjected to more severe conditions.

Examples of suitable primary, secondary, and tertiary alkylolamines for our purposes are as follows: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2-amino-2-methyl-1-propanol, octadecyldiethanolamine, polyethanolamine, etc. Alkylolamines with ether linkages in the alkyl group are intended as functional equivalents.

We do not desire to be limited by the above listing for other obvious equivalents to those skilled in the art may be employed to produce materials of the kind contemplated within the scope of this invention.

The sub-resinous colloid and the neutralization products thereof are believed to be new compositions. The neutralization or partial neutralization of the sub-resinous colloid is preferably effected with hydrochloric acid although other suitable acids may be used, including, for example, phosphoric acid and acetic acid.

The detergent forming body having an acidic function which is reacted with the dehydrated alkylolamine is preferably a naturally occurring or a modified glyceride of a fatty body having an inherently available acidic function, such as animal, marine and vegetable fats and oils, or the fatty acids thereof. Such materials as palmitin, olein, stearin, sardine oil, menhaden oil, sperm oil, and vegetable oils such as castor, coconut, soy bean, cottonseed, peanut, tung and oiticica are sources from which fatty bodies suitable for the purpose of the invention may be obtained. The aliphatic or fatty body portion of the sub-resinous product may also be modified in certain cases by reactions which involve an addition to the unsaturated ethylenic linkage. Through such a reaction hydroxy groups, sulfate groups and sulfonate groups may be introduced.

In general, the preferred detergent forming bodies possessing an inherently available acidic function are saturated and unsaturated detergent forming acids or esters having 8 or more carbon atoms in their fatty chains, as, for example, the higher fatty acids or vegetable oils, rosin and resin acids, naphthenic acids and the like. Modified products of detergent forming acids such as the sulfonated, halogenated, oxidized and internally esterified fatty bodies are also suitable for use in the preparation of our demulsifiers.

The product resulting from the reaction of the partially dehydrated alkylolamine and the detergent forming body may be further reacted with a monobasic or polybasic acid compound to yield an ester, or a nitrogen derivative. We contemplate this type of product as an oil-in-water demulsifier wherein the polybasic acid is not condensed for a long period of time but is only used as an acidic body for partial neutralization of our basic sub-resinous colloid. Where a polybasic acid compound is reacted in this manner any residual acidic groups may be further reacted with hydroxy groups to form esters, or with metals of the alkali or alkaline earth groups to form salts, or with amines to form amine salts, or further condensed to yield amides.

Examples of suitable hydrophilic un-ionized colloids are starches, dextrines, British gums, gum arabic, gelatin, glue, casein, gum tragacanth, gum karaya, agar-agar, tannin, urea-formaldehyde water dispersible resins and water soluble alkyl celluloses, e. g., methyl cellulose.

The reactions in forming the sub-resinous colloids are controlled in such a manner that the resultant products are soluble or colloidally dispersible in water, at least to the extent necessary to assure that they will find their way in minute quantities to the interfacial surfaces where their local action will produce the resolving effect. Since it is possible to secure effective resolving action by the addition of very small amounts of resolving agent, within a range from about 0.05% down as low as 0.0004% of the main mass to which the resolving agent is added, it will be apparent that the degree of solubility necessary can be quite low.

A resolving agent of the type herein described may be applied to the material to be demulsified in any of the suitable ways well known to those skilled in the art. Specifically it may be injected in a single small stream, either continuous or intermittent at short intervals into the flow line of an oil well, by means of a force feed pump. Or it may be added manually to the fluid in a gun barrel, using agitation with gas to secure thorough mixing. As prepared by the procedures herein outlined it is occasionally somewhat too concentrated, or viscous, or both, for convenient handling in commercial proportioning pumps but it may readily be diluted with any suitable hydrocarbon diluent employed as an intermediate vehicle. One such vehicle which is effective, cheap, and readily available is referred to by those skilled in the art as $SO_2$ extract. This material is a by-product from the Edeleanu process of refining petroleum in which undesirable fractions are removed by extraction with liquid sulfur dioxide. After removal of the sulfur dioxide a mixture of hydrocarbons, substantially aromatic in character, remains, which is designated in the trade as $SO_2$ extract.

The invention will be further illustrated but is not limited by the following examples, in which the quantities are stated in parts by weight unless otherwise indicated.

Example I

Twelve hundred (1200) pounds of commercial triethanolamine was heated with stirring. Nine and one-half (9½) hours were required to raise the temperature of the mass from 25 degrees C. to 240 degrees C. At this point an aqueous distillate began to collect in the condenser trap. The temperature was gradually increased to a maximum of 252 degrees C. over a period of 2 hours and held at this point with only a slight variation for an additional 4 hours. Some distillate continued after the heating had been stopped. The distillation progressed smoothly until a total of 22 gallons of an aqueous distillate has been secured. Following is a log of this process:

| Temperature | Time | Aqueous Distillate |
|---|---|---|
|  |  | Gallons |
| 25 Degrees C | 3:00 p. m | 0 |
| 74 Degrees C | 5:00 p. m | 0 |
| 240 Degrees C | 12:30 a. m | Trace |
| 248 Degrees C | 2:05 a. m | 2 |
| 252 Degrees C | 2:30 a. m | 3 |
| 251 Degrees C | 3:25 a. m | 5 |
| 251 Degrees C | 3:50 a. m | 7 |
| 252 Degrees C | 4:25 a. m | 9 |
| 251 Degrees C | 4:40 a. m | 11 |
| 250 Degrees C | 5:05 a. m | 13 |
| 249 Degrees C | 5:35 a. m | 15 |
| 249 Degrees C | 5:50 a. m | 17 |
| 243 Degrees C | 6:25 a. m | 19 |
| 235 Degrees C | 7:20 a. m | 21 |
| 231 Degrees C | 8:30 a. m | 22 |

Three hundred two (302) pounds of above processed triethanolamine, 780 pounds of castor oil and 123 pounds of $SO_2$ extract were mixed with stirring. Six hours were required to raise the temperature of mixture from 25 degrees C. to 185 degrees C. At this point an aqueous distillate began to appear in the condenser trap. Temperature was gradually increased to a maximum of 256 degrees all over a period of 6 hours, during which time distillation progressed smoothly until a total of 21 quarts of an aqueous distillate had been secured. Following is a log of this process:

| Temperature | Time | Aqueous Distillate |
|---|---|---|
|  |  | Quarts |
| 25 Degrees C | 8:00 a. m | 0 |
| 185 Degrees C | 2:00 p. m | Trace |
| 190 Degrees C | 3:00 p. m | 3 |
| 230 Degrees C | 4:00 p. m | 6 |
| 245 Degrees C | 5:00 p. m | 9 |
| 248 Degrees C | 6:00 p. m | 12 |
| 252 Degrees C | 7:00 p. m | 15 |
| 256 Degrees C | 8:00 p. m | 18 |
| 235 Degrees C | 9:00 p. m | 21 |

Two hundred (200) pounds of above intermediate, 120 pounds of isopropanol and 160 pounds of water were mixed at room temperature without heat effect to give a non-homogeneous mixture. Twenty-eight (28) pounds of 18 degree Bé. muriatic acid was gradually added with stirring to partially neutralize the excess basicity of the mass producing a moderate exothermic reaction and yielding a brilliant homogeneous solution.

A solution of 20 pounds of powdered bone glue was prepared in 200 pounds of water at 90 degrees C. The cooled glue solution was added to the solution of the partially neutralized intermediate to yield the finished product. The final product possessed the treating characteristics enumerated and is physically stable, brilliantly homogeneous, and has desired fluidity for ease of application.

Example II

Six hundred thirty (630) pounds of commercial #3 grade castor oil, 300 pounds of commercial triethanolamine, and 100 pounds $SO_2$ extract were heated to effect loss of an aqueous distillate as shown in the following log:

| Temperature | Time | Aqueous Distillate |
|---|---|---|
|  |  | Quarts |
| 215 Degrees C | 4:15 p. m | Trace |
| 228 Degrees C | 7:30 p. m | 5.5 |
| 232 Degrees C | 10:30 p. m | 12 |
| 249 Degrees C | 12:00 p. m | 15 |
| 235 Degrees C | 6:00 a. m | 21 |
| 240 Degrees C | 8:00 a. m | 24 |
| 241 Degrees C | 12:00 Noon | 30 |

Two hundred (200) pounds of the above processed intermediate, 120 pounds of isopropanol and 160 pounds of water were admixed and 28 pounds of 18 degrees Bé. muriatic acid gradually added with stirring to partially neutralize the excess basicity.

A solution of 20 pounds of powdered bone glue was prepared in 200 pounds of water at 90 degrees C. The cooled glue solution was added to the solution of the neutralized intermediate to yield the finished product. The final product possessed the treating characteristics enumerated and is physically stable, brilliantly homogeneous, and has the desired fluidity for ease of application.

Example III

Six hundred thirty (630) pounds castor oil and 100 pounds $SO_2$ extract were heated to 110 degrees C. and 10 pounds of commercial zinc chloride added, which dissolved almost at once. The temperature was raised to effect loss of an aqueous distillate, as shown in the following log:

| Temperature | Time | Aqueous Distillate |
|---|---|---|
|  |  | Quart |
| 165 Degrees C | 10:10 a. m | Trace |
| 190 Degrees C | 1:00 p. m | 3.5 |
| 190 Degrees C | 2:00 p. m | 6 |
| 194 Degrees C | 3:45 p. m | 9 |

The product after standing overnight was an amber colored, rather viscous fluid.

Six hundred (600) pounds of commercial triethanolamine was heated with stirring to effect the loss of an aqueous distillate as shown in the following log:

| Temperature | Time | Aqueous Distillate |
|---|---|---|
|  |  | Quarts |
| 245 Degrees C | 3:40 p. m | Trace |
| 252 Degrees C | 7:10 p. m | 11.5 |
| 257 Degrees C | 10:00 p. m | 30 |
| 259 Degrees C | 11:00 p. m | 37.5 |

To 722 pounds of the dehydrated castor oil were added 262 pounds of the above processed triethanolamine and the temperature was gradually raised to effect loss of an aqueous distillate as shown in the following log:

| Temperature | Time | Aqueous Distillate |
|---|---|---|
|  |  | Quarts |
| 183 Degrees C | 12:50 p. m | Trace |
| 243 Degrees C | 5:00 p. m | 9.0 |
| 246 Degrees C | 7:00 p. m | 22.0 |
| 250 Degrees C | 9:00 p. m | 36.0 |

Two hundred (200) pounds of above intermediate, 120 pounds of isopropanol and 160 pounds of water were mixed at room temperature without heat effect to give a non-homogeneous mixture. Twenty-eight (28) pounds of 18 degrees Bé. muriatic acid was gradually added with stirring to partially neutralize the excess basicity of the mass producing a moderate exothermic reaction and yielding a brilliant homogeneous solution.

A solution of 20 pounds of powdered bone glue was prepared in 200 pounds of water at 90 degrees C. The cooled glue solution was added to the solution of the partially neutralized intermediate to yield the finished product. The final product possessed the treating characteristics enumerated and is physically stable, brilliantly homogeneous, and has the desired fluidity for ease of application.

*Example IV*

(a) Twelve hundred (1200) parts of commercial triethanolamine were heated with agitation in a glass flask equipped with a moisture trap and return condenser which permits the removal of any aqueous distillate which may form during the heating. At a temperature of 245 degrees C. an aqueous distillate began to collect. After 17 hours of continuous heating and at a maximum temperature of 265 degrees C., a total of 300 parts of aqueous distillate were secured. The residual material in the flask constitutes our dehydrated triethanolamine. It is to be noted that no catalyst was employed. To 244 parts of the above prepared intermediate dehydrated triethanolamine were added 630 parts of castor oil and 100 parts of a suitable petroleum hydrocarbon which lends itself to azeotropic distillation. This mass was heated with agitation in a glass flask equipped with means for removing aqueous distillate as it forms. At a temperature of 185 degrees C. an aqueous distillate began to form. After 5½ hours of heating and stirring at a maximum temperature of 248 degrees C. a total of 36 parts of aqueous distillate was secured.

(b) Two hundred (200) parts of the foregoing reaction product were mixed with 120 parts of 99% isopropanol, and 160 parts of water. This mixture was slightly cloudy but on the addition of 28 parts of 18 degrees Bé. muriatic acid causing a slight increase in temperature the mixture became brilliantly clear and homogeneous. In a separate vessel 20 parts of pearl bone glue were dissolved in 200 parts of hot water and after cooling, this glue solution was added to the brilliantly clear solution of chemical as prepared above to yield the finished demulsifier.

*Example V*

Two hundred (200) parts of the product prepared as in Example IV(a), 120 parts of 99% isopropanol and 28 parts of 18 degrees Bé. hydrochloric acid were dissolved together, and to this solution was added a glue solution made by dissolving 40 parts of glue and 200 parts of hot water. To the resultant mass was then added an additional 60 parts of water and 60 parts of urea. After thorough stirring at room temperature (25 degrees C.) a demulsifying composition was obtained which was characterized by excellent stability, and which produced very good results in breaking reversed emulsions. Testing with this type of demulsifier indicates that the addition of the urea results in a composition with an improved demulsifying effect as compared with compositions not containing the urea, apparently due in part at least to the fact that this composition will tolerate increased concentrations of the active ingredients without gel formation at low temperatures.

Tests made on reversed emulsions from the Seven Sisters pool (Seven Sisters, Texas) demonstrated that the combination of the hydrophilic un-ionized colloid and a sub-resinous colloid of the type previously described produce excellent results when agitated with the reversed emulsion in the proportion of one gallon of the demulsifying composition to 166 barrels of reversed emulsion at ordinary temperatures (about 25 degrees C. to 30 degrees C.), and a still further improvement was obtained with the composition of Example V.

*Example VI*

(a) In a glass flask equipped with a moisture trap and return condenser which permits the removal of any aqueous distillate 1050 parts of commercial diethanolamine were heated with agitation. At a temperature of 210 degrees C. an aqueous distillate began to collect. After 17 hours of continuous heating and at a maximum temperature of 265 degrees C., a total of 100 parts of an aqueous distillate were secured. The residual material in the flask constitutes our dehydrated alkylolamine. It is to be noted that no catalyst was employed. To 220 parts of the above prepared intermediate was added 630 parts of castor oil and 100 parts of a suitable petroleum hydrocarbon which lends itself to azeotropic distillation. This mass was heated with agitation in a glass flask equipped with means for removing an aqueous distillate as it forms. At a temperature of 185 degrees C. an aqueous distillate began to form. After 6 hours of heating and stirring at a maximum temperature of 240 degrees C. a total of 36 parts of an aqueous distillate was secured.

(b) A mixture of 200 parts of the foregoing reaction product with 120 parts of 99% isopropanol, and 160 parts of water was prepared. To this slightly cloudy mass was added 28 parts of 18 degrees Bé. muriatic acid which resulted in a slight increase in temperature and a brilliantly clear and homogeneous solution. In a separate vessel 20 parts of pearl bone glue were dissolved in 200 parts of hot water and after cooling the glue solution was added to the brilliantly clear chemical solution as prepared above to yield the finished demulsifier.

*Example VII*

In an apparatus similar to that described in Example VI, 1330 parts of commercial ethyldiethanolamine were heated with agitation. At a temperature of 225 degrees C. an aqueous distillate began to form. After 12 hours of continuous heating and at a maximum temperature of 265 degrees C. a total of 100 parts of an aqueous distillate was secured. To 266 parts of the above prepared dehydrated alkylolamine was added 630 parts of castor oil and 100 parts of a suitable petroleum hydrocarbon. This mass was heated with agitation and at a temperature of 180 degrees C. an aqueous distillate began to form. After 7 hours of heating and stirring at a maximum temperature of 245 degrees C. a total of 36 parts of an aqueous distillate was secured.

The foregoing reaction product was mixed with isopropanol, water and glue solution in the same proportion and in the same manner as that described in Example VI.

In the foregoing examples the regular grade #3 castor oil employed had the following specifications:

| | |
|---|---|
| Sp. G. 15 degrees C. | 0.958–0.968 |
| Iodine No. | 82–90 |
| Saponification value | 177–187 |
| Acetyl value | 143–150 |
| Reichert Meissel value | 0.2–0.3 |
| Unsaponifiable matter | 0.3–0.7 |
| Refractive index 15 degrees C. | 1.4790–1.4813 |

The triethanolamine was a regular commercial grade, which is a colorless liquid having a specific gravity of 1.13 and containing 2% monoethanolamine and 11% diethanolamine. Its average equivalent weight is 140.

The SO₂ extract was a petroleum hydrocarbon composition having the following characteristics:

| | | |
|---|---|---|
| IBP | degrees C | 173 |
| FBP | do | 258 |
| Recovery | per cent | 98 |
| Residue | do | 1 |
| Loss | do | 1 |
| Per cent off at 190 degrees C | do | 22 |
| Color, Robinson | | 17¼ |
| Aromatics | per cent | 74 |
| Kauri butanol value | | 77 |

The isopropanol was a regular 99% commercial grade.

The glue was a powdered commercial bone glue.

The water employed was a tap water having the following analysis:

| | G. P. G. |
|---|---|
| Dissolved solids | 23.1 |
| Hardness | 2.9 |
| Methyl orange alkalinity | 11.7 |
| Chlorides | 6 |

In the foregoing examples the isopropanol and water in the proportions used serve as a mutual solvent between the sub-resinous colloid and the hydrophilic colloid. Other suitable solvents are butyl alcohol, diethylene glycol monobutyl ether, ethylene glycol monobutyl ether, and homologous water-miscible and fat-miscible alcohols and alcohol ethers.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water wettable colloid. The suitability of any of these products to the breaking and resolving of any given emulsion can readily be determined by the conventional procedures now in general use in oil fields and in laboratories which make such determinations.

The term "water soluble" is used to include the property of forming colloidally hydrated aqueous solution. From the foregoing description it will be seen that only a limited degree of actual "water solubility" is necessary for the reagents used for breaking petroleum emulsions, for the reason that extremely small proportions of the reagents are ordinarily used. The term "oil soluble" is used to include the property of colloidal dispersion in the oil phase.

The invention is hereby claimed as follows:

1. A process for the resolution of a reversed emulsion of the oil-in-water type, which comprises subjecting the emulsion to the action of a sub-resinous colloid which is a reaction product of a molecularly dehydrated alkylolamine and a detergent forming body possessing an acidic function and containing at least 8 carbon atoms in a hydrocarbon structure, at least partially neutralized with an acid, and admixed with a hydrophilic un-ionized colloid, the quantity of said hydrophilic un-ionized colloid being 5% to 25% by weight of said reaction product.

2. A process for the resolution of a reversed emulsion of the oil-in-water type, which comprises subjecting the emulsion to the action of a reaction product of a fatty body with a molecularly dehydrated alkylolamine, at least partially neutralized with an acid, and admixed with a hydrophilic un-ionized colloid, the quantity of said hydrophilic un-ionized colloid being 5% to 25% by weight of said reaction product.

3. A process for the resolution of a reversed emulsion of the oil-in-water type, which comprises subjecting the emulsion to the action of a sub-resinous colloid which is a reaction product of a molecularly dehydrated alkylolamine and a detergent forming body possessing an acidic function and containing at least 8 carbon atoms in a hydrocarbon structure, at least partially neutralized with an acid, and admixed with a hydrophilic un-ionized colloid and a gel liquefying agent for said colloid, the quantity of said hydrophilic un-ionized colloid being 5% to 25% by weight of said reaction product.

4. A process for the resolution of a reversed emulsion of the oil-in-water type, which comprises subjecting the emulsion to the action of a sub-resinous colloid which is a reaction product of a molecularly dehydrated alkylolamine and a detergent forming body possessing an acidic function and containing at least 8 carbon atoms in a hydrocarbon structure, at least partially neutralized with an acid, and admixed with a hydrophilic un-ionized colloid and urea, the quantity of said hydrophilic un-ionized colloid being 5% to 25% by weight of said reaction product.

5. A process for the resolution of a reversed emulsion of the oil-in-water type, which comprises subjecting the emulsion to the action of a sub-resinous colloid which is a reaction product of a molecularly dehydrated triethanolamine and a detergent forming body possessing an acidic function and containing at least 8 carbon atoms in a hydrocarbon structure, at least partially neutralized with an acid, and admixed with a hydrophilic un-ionized colloid, the quantity of said hydrophilic un-ionized colloid being 5% to 25% by weight of said reaction product.

6. A process for the resolution of a reversed emulsion of the oil-in-water type, which comprises subjecting the emulsion to the action of a sub-resinous colloid which is a reaction product of a molecularly dehydrated triethanolamine and a detergent forming body possessing an acidic function and containing at least 8 carbon atoms in a hydrocarbon structure, at least partially neutralized with an acid, and admixed with a hydrophilic un-ionized colloid, and a mutual solvent for said sub-resinous colloid and said hydrophilic un-ionized colloid, the quantity of said hydrophilic un-ionized colloid being 5% to 25% by weight of said reaction product.

7. A process for the resolution of a reversed emulsion of the oil-in-water type, which comprises subjecting the emulsion to the action of a condensation product of a partially molecularly dehydrated triethanolamine and castor oil, at least partially neutralized with an acid, and admixed with a hydrophilic un-ionized colloid, the quantity of said hydrophilic un-ionized colloid being from 5% to 25% by weight of said condensation product.

8. A process for the resolution of a reversed emulsion of the oil-in-water type, which comprises subjecting the emulsion to the action of a condensation product of a partially molecularly dehydrated triethanolamine and castor oil, at least partially neutralized with an acid, and admixed with a hydrophilic un-ionized colloid, and a mutual solvent for said condensation product and said hydrophilic un-ionized colloid, the quantity of said hydrophilic un-ionized colloid being from 5% to 25% by weight of said condensation product.

9. A process for the resolution of a reversed emulsion of the oil-in-water type, which comprises subjecting the emulsion to the action of a condensation product of a partially molecularly dehydrated triethanolamine and castor oil, at least partially neutralized with an acid, and admixed with a hydrophilic un-ionized colloid, and a water-miscible and fat-miscible solvent, the quantity of said hydrophilic un-ionized colloid being from 5% to 25% by weight of said condensation product.

10. A process for the resolution of a reversed emulsion of the oil-in-water type, which comprises subjecting the emulsion to the action of a condensation product of a molecularly dehydrated triethanolamine and castor oil, at least partially neutralized with hydrochloric acid, and admixed with bone glue, isopropanol and water, the quantity of bone glue being from 5% to 25% by weight of said condensation product.

11. A process for the resolution of a reversed emulsion of the oil-in-water type, which comprises subjecting the emulsion to the action of a condensation product of a molecularly dehydrated triethanolamine and castor oil, at least partially neutralized with hydrochloric acid, and admixed with bone glue, isopropanol, water and urea, the quantity of bone glue being from 5% to 25% by weight of said condensation product.

12. A composition comprising a sub-resinous colloid which is the reaction product of a partially molecularly dehydrated alkylolamine with a detergent forming body possessing an acidic function and containing at least 8 carbon atoms in a hydrocarbon structure, neutralized at least in part with an acid, and admixed with a hydrophilic un-ionized colloid, said sub-resinous colloid being water wettable and having interfacial active properties and surface active properties effective to resolve oil-in-water emulsions, the quantity of said hydrophilic un-ionized colloid being 5% to 25% by weight of said reaction product.

13. A composition comprising an oil-in-water demulsifying sub-resinous colloid which is the condensation product of a molecularly dehydrated triethanolamine and a detergent forming body possessing an acidic function, and containing at least 8 carbon atoms and a hydrocarbon structure, at least partially neutralized with an acid, and admixed with a hydrophilic un-ionized colloid and a gel liquefying agent for said colloid, the quantity of said hydrophilic un-ionized colloid being from 5% to 25% by weight of said condensation product.

14. A composition comprising an oil-in-water demulsifying condensation product of a partially molecularly dehydrated triethanolamine and castor oil, at least partly neutralized with hydrochloric acid, and admixed with bone glue, the quantity of bone glue being from 5% to 25% by weight of said condensation product.

15. A composition comprising the condensation product of a partially molecularly dehydrated triethanolamine and castor oil, at least partly neutralized with hydrochloric acid, and admixed with bone glue and urea, the quantity of bone glue being from 5% to 25% by weight of said condensation product.

WILLARD H. KIRKPATRICK.
DOYNE L. WILSON.

No references cited.